United States Patent
Park et al.

(10) Patent No.: US 12,181,285 B2
(45) Date of Patent: Dec. 31, 2024

(54) ELECTRONIC APPARATUS AND CONTROL METHOD THEREOF

(71) Applicant: Samsung Electronics Co., Ltd., Suwon-si (KR)

(72) Inventors: Yosub Park, Suwon-si (KR); Hyunki Hong, Suwon-si (KR); Jewoong Ryu, Suwon-si (KR); Sejin Kwak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 940 days.

(21) Appl. No.: 17/167,450

(22) Filed: Feb. 4, 2021

(65) Prior Publication Data
US 2021/0247190 A1 Aug. 12, 2021

(30) Foreign Application Priority Data
Feb. 6, 2020 (KR) .................. 10-2020-0014085

(51) Int. Cl.
*G01S 17/42* (2006.01)
*G01C 17/02* (2006.01)
*G01C 21/16* (2006.01)
*G01S 17/89* (2020.01)

(52) U.S. Cl.
CPC ......... *G01C 21/1652* (2020.08); *G01C 17/02* (2013.01); *G01C 21/1654* (2020.08); *G01S 17/42* (2013.01); *G01S 17/89* (2013.01)

(58) Field of Classification Search
None
See application file for complete search history.

(56) References Cited

U.S. PATENT DOCUMENTS

| | | |
|---|---|---|
| 7,660,592 B2 | 2/2010 | Oh |
| 8,270,999 B2 | 9/2012 | Oh |
| 9,164,509 B2 | 10/2015 | Kim et al. |
| 11,087,494 B1* | 8/2021 | Srinivasan ............. G01S 17/89 |
| 2007/0155407 A1 | 7/2007 | Oh |

(Continued)

FOREIGN PATENT DOCUMENTS

| | | |
|---|---|---|
| CN | 109737968 A | 5/2019 |
| JP | 2017-102942 A | 6/2017 |

(Continued)

OTHER PUBLICATIONS

International Search Report dated May 25, 2021, issued in an International Application No. PCT/KR2021/001558.

(Continued)

*Primary Examiner* — Hovhannes Baghdasaryan
(74) *Attorney, Agent, or Firm* — Jefferson IP Law, LLP

(57) ABSTRACT

An electronic apparatus and a method of controlling thereof are provided. The method of controlling the electronic apparatus includes obtaining a light detection and ranging (LiDAR) map for estimating a location of the electronic apparatus, based on an event for obtaining the location of the electronic apparatus occurring, obtaining geomagnetic information around the electronic apparatus using a geomagnetic sensor, identifying a direction of the electronic apparatus based on the obtained geomagnetic information, and obtaining the location of the electronic apparatus on the LiDAR map based on the identified direction and the LiDAR sensor.

16 Claims, 9 Drawing Sheets

(56) References Cited

U.S. PATENT DOCUMENTS

| | | | |
|---|---|---|---|
| 2008/0239279 A1* | 10/2008 | Krishnaswamy | G01S 17/86 |
| | | | 356/5.01 |
| 2010/0099438 A1 | 4/2010 | Oh | |
| 2014/0233010 A1* | 8/2014 | Baldwin | G01S 7/4808 |
| | | | 356/4.01 |
| 2015/0097554 A1 | 4/2015 | Park | |
| 2016/0077202 A1 | 3/2016 | Hirvonen et al. | |
| 2016/0370491 A1 | 12/2016 | Fechine et al. | |
| 2017/0003131 A1 | 1/2017 | Myeong et al. | |
| 2017/0313303 A1 | 11/2017 | Valtanen | |
| 2018/0129220 A1* | 5/2018 | Beach | G05D 1/0225 |
| 2018/0188043 A1* | 7/2018 | Chen | G06T 7/11 |
| 2020/0103529 A1 | 4/2020 | Yeon et al. | |

FOREIGN PATENT DOCUMENTS

| | | |
|---|---|---|
| KR | 10-0651594 B1 | 11/2006 |
| KR | 10-0953079 B1 | 4/2010 |
| KR | 10-2014-0108821 A | 9/2014 |
| KR | 10-2015-0044090 A | 4/2015 |
| KR | 10-1527212 B1 | 6/2015 |
| KR | 10-1531182 B1 | 6/2015 |
| KR | 10-1730714 B1 | 4/2017 |
| KR | 10-1738751 B1 | 5/2017 |
| KR | 10-1831028 B1 | 2/2018 |
| KR | 10-2018-0094493 A | 8/2018 |
| KR | 10-1948728 B1 | 2/2019 |
| WO | 2009/061058 A1 | 5/2009 |

OTHER PUBLICATIONS

Written Opinion dated May 25, 2021, issued in an International Application No. PCT/KR2021/001558.

* cited by examiner

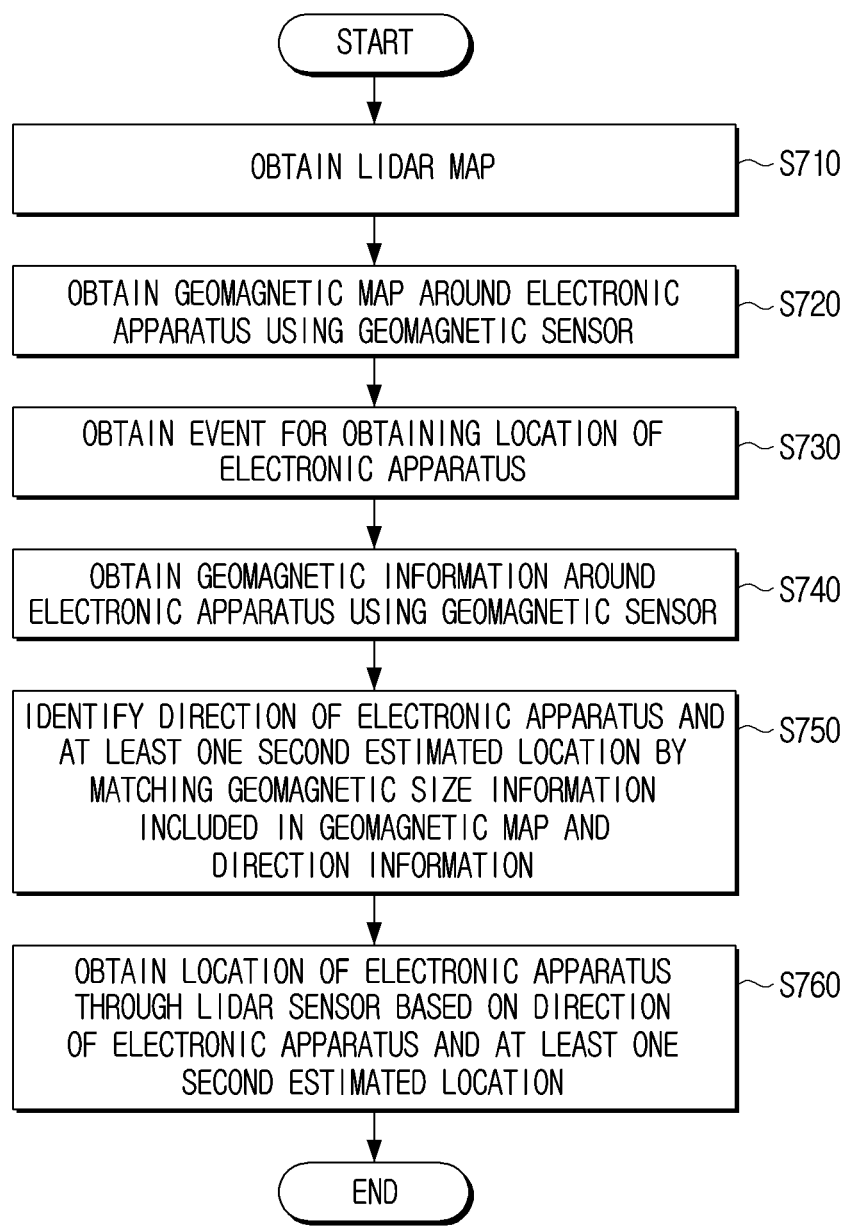

ELECTRONIC APPARATUS AND CONTROL METHOD THEREOF

CROSS-REFERENCE TO RELATED APPLICATION(S)

This application is based on and claims priority under 35 U.S.C. § 119 (a) of a Korean patent application number 10-2020-0014085, filed on Feb. 6, 2020, in the Korean Intellectual Property Office, the disclosure of which is incorporated by reference herein in its entirety.

BACKGROUND

1. Field

The disclosure relates to an electronic apparatus and a method of controlling thereof. More particularly, the disclosure relates to an electronic apparatus for obtaining a location of an electronic apparatus using a magnetic field sensor and a light detection and ranging (LiDAR) sensor, and a method of controlling method thereof.

2. Description of Related Art

The technology that performs simultaneous localization and mapping (SLAM) using a LiDAR sensor has been used to estimate a location of an electronic apparatus such as a mobile robot device. However, it is necessary to search for all locations and angles in the LiDAR map using the LiDAR sensor in order to estimate the location of an electronic apparatus by performing SLAM using only the LiDAR sensor, which has caused a high complexity.

Accordingly, there is an increasing demand for SLAM that estimates the location of an electronic apparatus by using other sensors together with a LiDAR sensor.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, as aspect of the disclosure is to provide an electronic apparatus that obtains a location of the electronic apparatus through geomagnetic information obtained from a geomagnetic sensor and a LiDAR sensor.

Additional aspects will be set forth in part in the description which follows and, in part, will be apparent from the description, or may be learned by practice of the presented embodiments.

In accordance with an aspect of the disclosure, a method of controlling an electronic apparatus is provided. The method includes obtaining a LiDAR map for estimating a location of the electronic apparatus, based on an event for obtaining the location of the electronic apparatus occurring, obtaining geomagnetic information around the electronic apparatus using a geomagnetic sensor, identifying a direction of the electronic apparatus based on the obtained geomagnetic information, and obtaining the location of the electronic apparatus on the LiDAR map based on the identified direction and the LiDAR sensor.

In accordance with another aspect of the disclosure, an electronic apparatus is provided. The electronic apparatus includes a memory configured to store at least one instruction, and a processor configured to execute at least one instruction stored in the memory to control the electronic apparatus, wherein the processor is configured to obtain a LiDAR map for estimating a location of the electronic apparatus, based on an event for obtaining the location of the electronic apparatus occurring, obtain geomagnetic information around the electronic apparatus using a geomagnetic sensor, identify a direction of the electronic apparatus based on the obtained geomagnetic information, and obtain the location of the electronic apparatus on the LiDAR map based on the identified direction and the LiDAR sensor.

As described above, according to various embodiments of the disclosure, the electronic apparatus may quickly estimate a location of an electronic apparatus with less complexity in performing a LiDAR-based SLAM by using geomagnetic information obtained from a geomagnetic sensor.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which: the FIG. 1 is a view illustrating an operation of an electronic apparatus according to an embodiment of the disclosure;

FIG. 7 is a flowchart illustrating a method of obtaining a location of an electronic apparatus by further using a geomagnetic map according to an embodiment of the disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
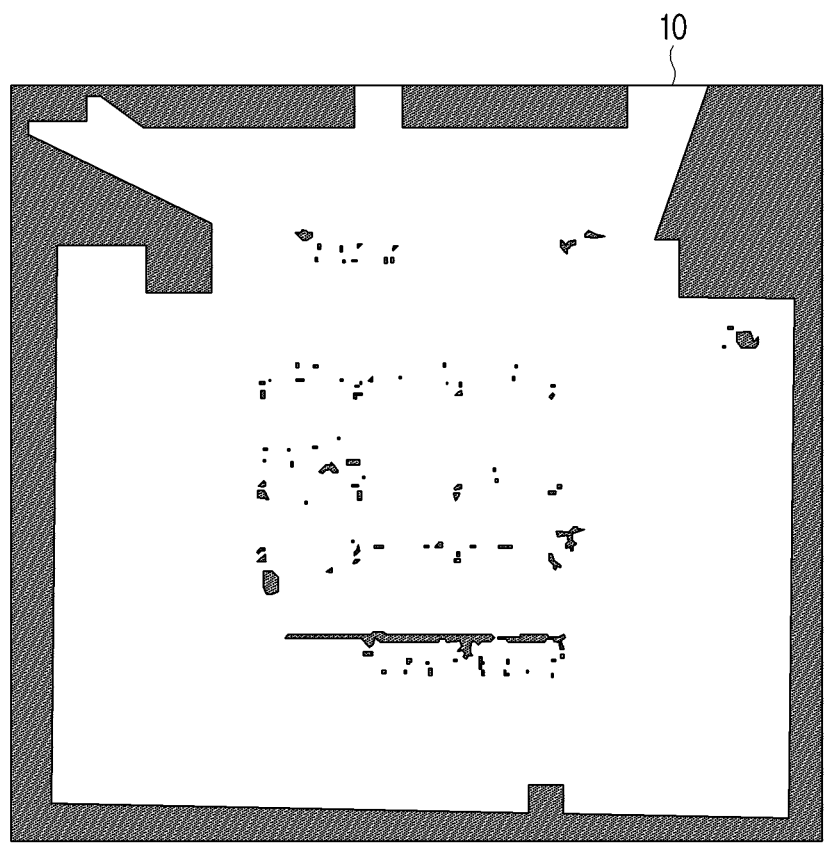
Figure 1:
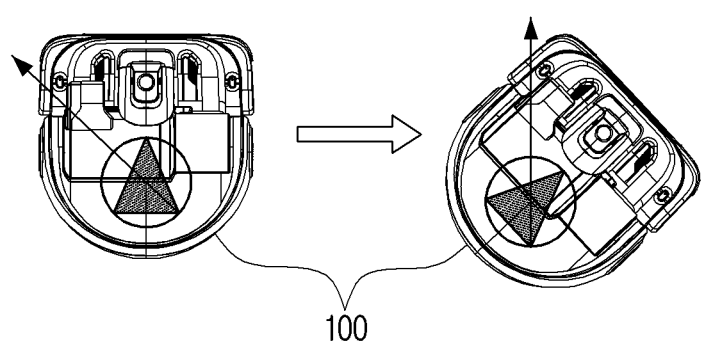

FIG. 1 is a view illustrating an operation of an electronic apparatus according to an embodiment of the disclosure.

Referring to FIG. 1, it is a view illustrating matching directions of an electronic apparatus 100 in a LiDAR map 10 for estimating a location of an electronic apparatus. The electronic apparatus 100 according to the disclosure may be a mobile robot device, and may be implemented as various robots such as robots that perform tasks such as cleaning, air purification, security, etc. while traveling in buildings, robots that perform housework while traveling in home, military robots that are put into dangerous areas where humans cannot access and perform tasks. However, the disclosure is not limited thereto, and the electronic apparatus 100 according to the disclosure may be implemented as various types of electronic apparatuses such as a wireless terminal, a smartphone, a car, a drone, or the like.

The electronic apparatus 100 may obtain a location of the electronic apparatus 100 based on a result of scanning surroundings of the electronic apparatus 100 using a light detection and ranging sensor. Specifically, the electronic apparatus 100 may obtain a LiDAR map 10 for an area to which the electronic apparatus 100 is to move through a LiDAR sensor. However, the disclosure is not limited thereto, and the electronic apparatus 100 may receive a LiDAR map for an area to which the electronic apparatus moves to obtain a LiDAR map.

The LiDAR map 10 is a map for performing a simultaneous localization and mapping (SLAM) using a LiDAR sensor, and the electronic apparatus 100 may obtain a location of the electronic apparatus 100 in the LiDAR map 10, as a result of performing the SLAM through the LiDAR sensor. In addition, the SLAM is a technology for estimating a map of a space and a current location for an electronic apparatus capable of searching the surroundings while moving in an arbitrary space.

After the LiDAR map 10 is obtained, an event for obtaining the location of the electronic apparatus may occur. The event for obtaining the location of the electronic apparatus according to the disclosure may include a first event in which the electronic apparatus is turned off and on, a second event in which the user lifts the electronic apparatus and moves it at a random place, a third event when a difference between an initially obtained map and a currently scanned map is large, a fourth event in which the electronic apparatus are lost while driving, and a fifth event in which scanning is impossible since the electronic apparatus is surrounded by people. However, the disclosure is not limited thereto, and the electronic apparatus may further include various events for estimating the location.

When the LiDAR map is obtained and an event for obtaining the location of the electronic apparatus occurs, the electronic apparatus 100 may obtain geomagnetic information around the electronic apparatus 100 using a geomagnetic sensor included in the electronic apparatus 100.

The geomagnetic sensor is a sensor for measuring a geomagnetic value around the sensor, and may be included in the electronic apparatus 100. The geomagnetic sensor according to the disclosure may be an inertia measurement unit (IMU) sensor, but is not limited thereto and may include various sensors capable of measuring a geomagnetic value. In addition, geomagnetic information according to the disclosure may be obtained based on a geomagnetic value measured by a geomagnetic sensor. For example, the geomagnetic information may include information on a geomagnetic direction around the electronic apparatus 100 and information on a geomagnetic size around the electronic apparatus 100.

Also, when the geomagnetic information is obtained, the electronic apparatus 100 may identify the direction of the electronic apparatus based on the geomagnetic information. As an embodiment of the disclosure, the electronic apparatus 100 may identify the direction of the electronic apparatus through information on the geomagnetic direction included in the geomagnetic information. Specifically, a direction of true north may be identified using information on the direction of the geomagnetic. In addition, the identified true north direction may be matched with a true north direction in the obtained LiDAR map 10 to identify a direction of the electronic apparatus 100 in the LiDAR map 10. For example, referring to FIG. 1, the electronic apparatus 100 may identify that the true north direction is −45 degrees from the direction (a direction that the front surface is headed) in which the electronic apparatus moves through the geomagnetic information around the electronic apparatus 100. Also, the electronic apparatus 100 may align the true north direction identified through geomagnetic information with the true north direction in the LiDAR map 10, such that the electronic apparatus 100 may identify the direction of the electronic apparatus 100 is in +45-degree direction based on the true north direction in the LiDAR map.

When the direction of the electronic apparatus 100 is identified, the electronic apparatus 100 may obtain the location of the electronic apparatus on the LiDAR map 10 through the identified direction and LiDAR sensor. According to an embodiment of the disclosure, the location of the electronic apparatus may be obtained by performing a search using the LiDAR sensor with priority with respect to a direction of a radius of a predetermined range from the identified direction. The predetermined range radius according to the disclosure may be a radius of +20 degrees from the identified direction, and referring to FIG. 1, the electronic apparatus 100 may search by priority between 25 degrees and 65 degrees based on the true north direction in the LiDAR map 10.

When the location of the electronic apparatus in the LiDAR map 10 is obtained as a result of using the LiDAR sensor in the direction of the predetermined range radius, the electronic apparatus 100 may stop searching.

However, when the location of the electronic apparatus in the LiDAR map 10 is not obtained as a result of using the LiDAR sensor in the direction of the predetermined range radius, the electronic apparatus 100 may search by using the LiDAR sensor for a direction of 360 degrees to obtain the location of the electronic apparatus 100. However, the disclosure is not limited thereto, and when the location of the electronic apparatus in the LiDAR map 10 is not obtained as a result of using the LiDAR sensor in the direction of the predetermined range radius, the electronic apparatus 100 may perform search by gradually increasing the radius.

According to the embodiment described above, the electronic apparatus 100 may obtain the location of the electronic apparatus faster and less complex than before by further using geomagnetic direction information in performing SLAM using the LiDAR sensor.

Figure 2A:
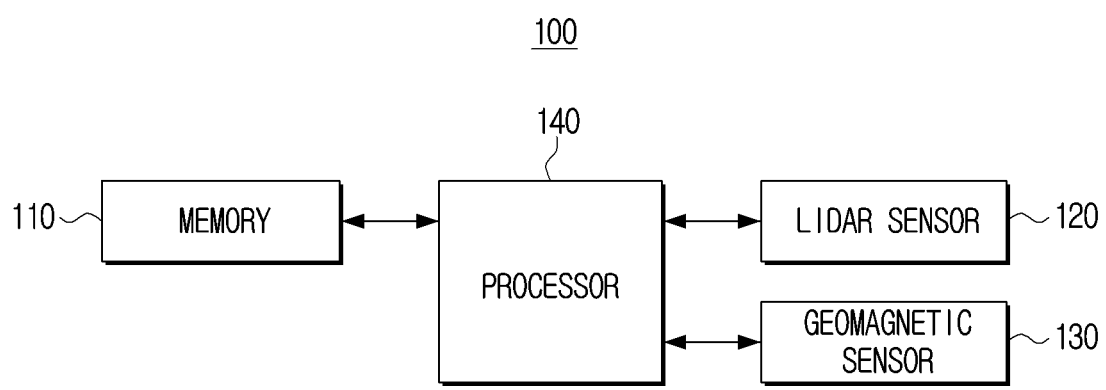
FIG. 2A is a block diagram illustrating a configuration of an electronic apparatus according to an embodiment of the disclosure.

FIG. 2A is view illustrating a configuration of an electronic apparatus, according to an embodiment of the disclosure.

Referring to FIG. 2A, the electronic apparatus 100 may include a memory 110, a LiDAR sensor 120, a geomagnetic sensor 130, and a processor 140. Meanwhile, the configuration illustrated in FIG. 2A is an example view for implementing embodiments of the disclosure, and appropriate hardware and software configurations that are obvious to those skilled in the art may be additionally included in the electronic apparatus 100.

The memory 110 may store an instruction or data regarding at least one of the other elements of the electronic apparatus 100. An instruction is one action statement for the processor 140 in a programming language, and is the smallest unit of a program that the processor 140 can directly perform. The memory 110 may be implemented as a non-volatile memory, a volatile memory, a flash memory, a hard disk drive (HDD) or a solid state drive (SDD). The memory 110 may be accessed by the processor 140, and perform readout, recording, correction, deletion, update, and the like, on data by the processor 140. According to an embodiment of the disclosure, the term of the storage may include the memory 110, read-only memory (ROM) (not illustrated) and random access memory (RAM) (not illustrated) within the processor 140, and a memory card (not illustrated) attached to the electronic apparatus 100 (e.g., micro secure digital (SD) card or memory stick). Also, the memory 110 may store a program, data, and the like for constituting various types of screens that will be displayed in the display area of the display 190.

In particular, the LiDAR map may be pre-stored in the memory 110. The LiDAR map pre-stored through the LiDAR sensor may be updated and stored in the memory 110.

In addition, geomagnetic information for identifying the direction or location of the electronic apparatus may be stored in the memory 110. In addition, the memory 110 may pre-store information on a direction of the predetermined range radius for setting a search radius of the LiDAR sensor (e.g., +20 degrees from an identified direction) and information on the location of the predetermined range radius (e.g., +_1 meter (m) from the identified location). Meanwhile, information on the location of the predetermined range radius and information on the direction of the predetermined range radius stored in the memory 110 may be changed by a user input.

The LiDAR sensor 120 is a sensor capable of obtaining information on a physical feature regarding a target object (a location and direction of the electronic apparatus 100, a distance between the electronic apparatus 100 and the target object, shape and movement speed of the target object, etc.) by using time it takes for a laser pulses scattered or reflected from a target device to return by firing the laser pulse, and changes in intensity, frequency, and polarization state of scattered or reflected lasers. Specifically, the electronic apparatus 100 may obtain a LiDAR map by scanning the surroundings of the mobile robot device (e.g., electronic apparatus 100) by using the LiDAR sensor 120. The LiDAR map is a map that can be obtained using information on physical features of the electronic apparatus obtained using a laser pulse of the LiDAR sensor 120. Also, the electronic apparatus 100 may perform SLAM using the LiDAR sensor 120 to obtain information on the location of the electronic apparatus 100 in the LiDAR map.

The geomagnetic sensor 130 is a sensor for detecting a value of a geomagnetism, and information on a geomagnetic direction around the geomagnetic sensor 130 and information on the size of the geomagnetic may be obtained through the geomagnetic sensor. As an example of the disclosure, the geomagnetic sensor 130 may be implemented in the form of an inertial measurement unit (IMU) sensor. However, the disclosure is not limited thereto, and may be implemented with various sensors capable of measuring a geomagnetic value.

The processor 140 may control an overall operation of the electronic apparatus 100 by being electronically connected to the memory 110. In particular, the processor 140 may obtain a LiDAR map for estimating the location of the electronic apparatus 100. As an embodiment, the LiDAR map may be obtained using information on physical features acquired through the LiDAR sensor 120 of the electronic apparatus 100. However, it is not limited thereto, and the processor 140 may obtain the LiDAR map by receiving a LiDAR map with respect to a current location from the other external apparatus. In other words, when a LiDAR map generated from the other external apparatus exists, the processor 140 may receive a LiDAR map generated from the other external apparatus and obtain the LiDAR map.

In addition, when an event for obtaining the location of the electronic apparatus occurs, the processor 140 may obtain geomagnetic information around the electronic apparatus 100 by using the geomagnetic sensor 130. Events for obtaining the location of the electronic apparatus may include the first to fifth events described with reference to FIG. 1, but are not limited thereto, and may further include various events for the electronic apparatus to estimate the location.

In addition, the geomagnetic information according to the disclosure may be obtained based on a geomagnetic value measured by the geomagnetic sensor. For example, the geomagnetic information may include information on a geomagnetic direction around the electronic apparatus 100 and information on a geomagnetic size around the electronic apparatus 100.

In addition, when the geomagnetic information is obtained, the processor 140 may identify a direction of the electronic apparatus based on the geomagnetic information. As an example of the disclosure, the processor 140 may identify a direction of an electronic apparatus through information on the geomagnetic direction included in the geomagnetic information. Specifically, the processor 140 may identify the true north direction by using the information on geomagnetic direction. The processor 140 may match the identified true north direction with the true north direction in the obtained LiDAR map to identify the direction of the electronic apparatus 100. Also, the electronic apparatus 100 may align the true north direction identified through geomagnetic information with the true north direction in the LiDAR map 10, and identify that the direction of the electronic apparatus 100 is the direction of the electronic apparatus 100 in the LiDAR map.

When the direction of the electronic apparatus 100 is identified, the processor 140 may obtain the location of the electronic apparatus on the LiDAR map through the identified direction and the LiDAR sensor. According to an embodiment of the disclosure, a location of the electronic apparatus may be obtained by performing a search using a LiDAR sensor with priority for a direction of a radius of a predetermined range from the identified direction. The predetermined range radius according to the disclosure may be a radius of +_20 degrees from the identified direction, and the electronic apparatus 100 may search first a radius range between 25 degrees and 65 degrees based on the identified direction in the LiDAR map through the LiDAR sensor.

When the location of the electronic apparatus in the LiDAR map is obtained as a result of using the LiDAR sensor in the direction of the predetermined range radius, the processor 140 may stop searching.

However, when the location of the electronic apparatus in the LiDAR map is not obtained as a result of using the LiDAR sensor for the direction of the predetermined range radius, the processor 140 may perform search using the LiDAR sensor for the direction of 360 degrees to obtain the location of the electronic apparatus 100. However, the disclosure is not limited thereto, if the location of the electronic apparatus in the LiDAR map is not obtained as a result of using the LiDAR sensor in the direction of the predetermined range radius, the processor 140 may gradually increase the predetermined range radius to perform search.

When the latest location of the electronic apparatus 100 is pre-stored, if an event for obtaining the location of the electronic apparatus 100 occurs, the processor 140 may use at least one of an IMU sensor and a wheel encoder, and identify a first estimated location of the electronic apparatus on the LiDAR map. The processor 140 may perform a search through the LiDAR sensor using the first estimated location and the identified direction of the electronic apparatus 100 to obtain the location of the electronic apparatus 100 on the LiDAR map. The IMU sensor is an inertial measurement sensor and may be implemented as an acceleration sensor, an angular velocity sensor, a geomagnetic sensor, and an altimeter sensor.

The latest location of the electronic apparatus 100 is pre-stored in the memory 110, and in order to obtain the current location of the electronic apparatus 100, the electronic apparatus 100 may use an IMU sensor or a wheel encoder to preferentially estimate the location of the electronic apparatus 100 based on the latest location of the electronic apparatus 100. Specifically, when the IMU sensor is used, the first estimated location of the electronic apparatus 100 may be identified through a method of obtaining acceleration and angular velocity of the electronic apparatus from the IMU sensor and integrating the obtained acceleration and angular velocity. When the wheel encoder is used, the first estimated location of the electronic apparatus 100 may be identified based on information on a trajectory of the electronic apparatus 100 obtained through the wheel encoder.

In addition, the electronic apparatus 100 may preferentially obtain the location of the electronic apparatus 100 on the LiDAR map by performing a search through the LiDAR sensor for the vicinity of the identified first estimated location.

In addition, according to an embodiment of the disclosure, the processor 140 may perform a search through the LiDAR sensor by using the identified first estimated location and the direction of the electronic apparatus identified through the geomagnetic sensor together. Specifically, the processor 140 may perform a search through the LiDAR sensor preferentially for a location (e.g., 1 m) of the predetermined range radius from the first estimated location obtained through at least one of the IMU sensor and the wheel encoder, and a direction (e.g., +_20 degrees) of the predetermined range radius from the direction of the identified electronic apparatus in order to obtain the location of the electronic apparatus 100.

According to an embodiment of the disclosure, the processor 140 may obtain the location of the electronic apparatus 100 by further using the geomagnetic map. The processor 140 may obtain a geomagnetic map of the vicinity of the electronic apparatus using the geomagnetic sensor. The geomagnetic map is a map showing geomagnetic size information and geomagnetic direction information for a certain area. According to an embodiment, the electronic apparatus 100 may obtain a geomagnetic map using the geomagnetic sensor 130 of the electronic apparatus 100 while traveling an area in which a geomagnetic map is to be generated, but is not limited thereto, and may receive the geomagnetic map from an external apparatus storing the geomagnetic map.

The processor 140 may match the geomagnetic size information and direction information included in the geomagnetic map with the geomagnetic information around the electronic apparatus 100 obtained through the geomagnetic sensor 130 to identify the direction of the electronic apparatus and at least one second estimated location.

Figure 3A:
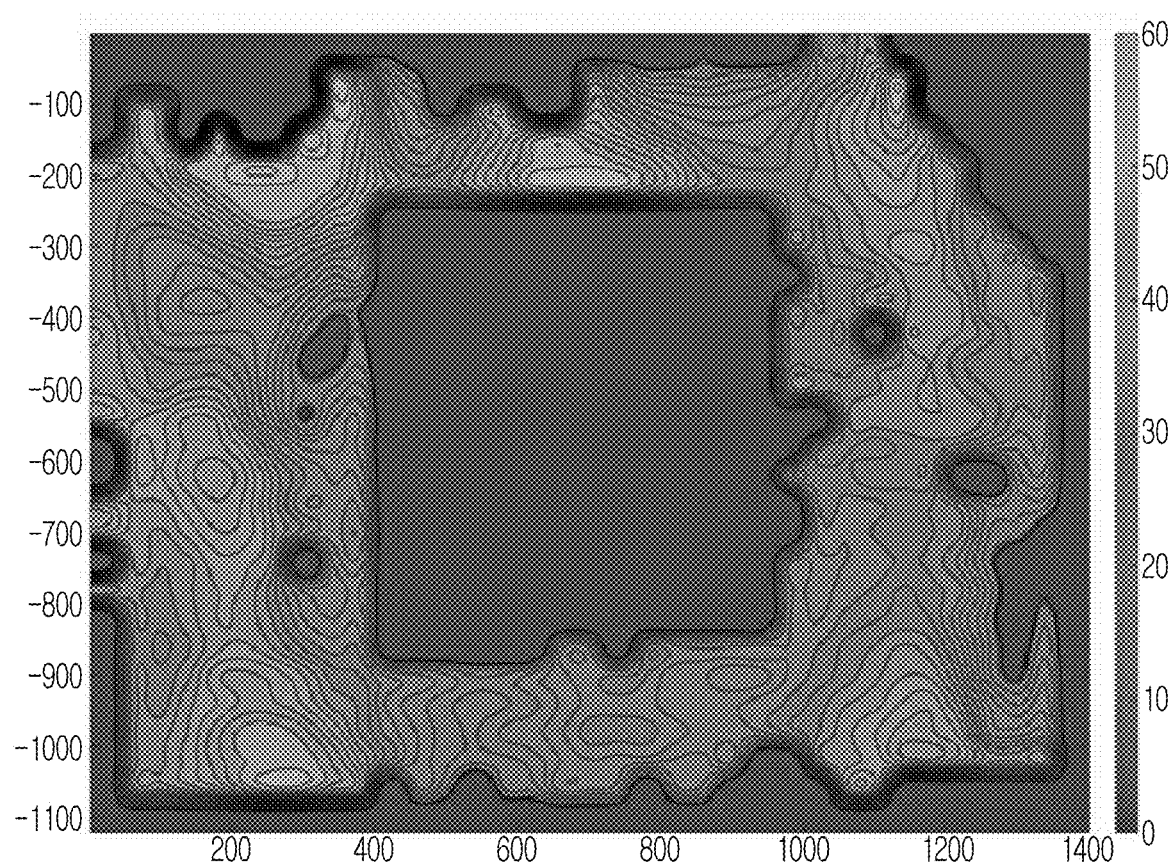
FIG. 3A is a view illustrating a geomagnetic map indicating geomagnetic size information according to an embodiment of the disclosure.

FIG. 3A is a view illustrating a geomagnetic map indicating geomagnetic size information according to an embodiment of the disclosure.

Referring to FIG. 3A, geomagnetic size information for an area included in a map may be identified through the geomagnetic map. Specifically, at least one third estimated location of the electronic apparatus 100 may be identified by matching the geomagnetic size information included in the geomagnetic map with the geomagnetic size information included in the geomagnetic information obtained through the geomagnetic sensor 130. For example, if a size of the geomagnetic around the electronic apparatus 100 obtained through the geomagnetic sensor 130 is A tesla (T), the processor 140 may identify a location in which the size of the geomagnetic field is AT as the third estimated location. However, the disclosure is not limited thereto, and a location in a predetermined range (e.g., 1 m) from the location in which the size of the geomagnetic field is A T (tesla) may be identified as the third estimated location.

In addition, the processor 140 may match the geomagnetic direction information included in the geomagnetic map with the geomagnetic direction information included in the geomagnetic information obtained through the geomagnetic sensor 130 to identify at least one second estimated location of the electronic apparatus 100 and the direction of the electronic apparatus.

Figure 3B:
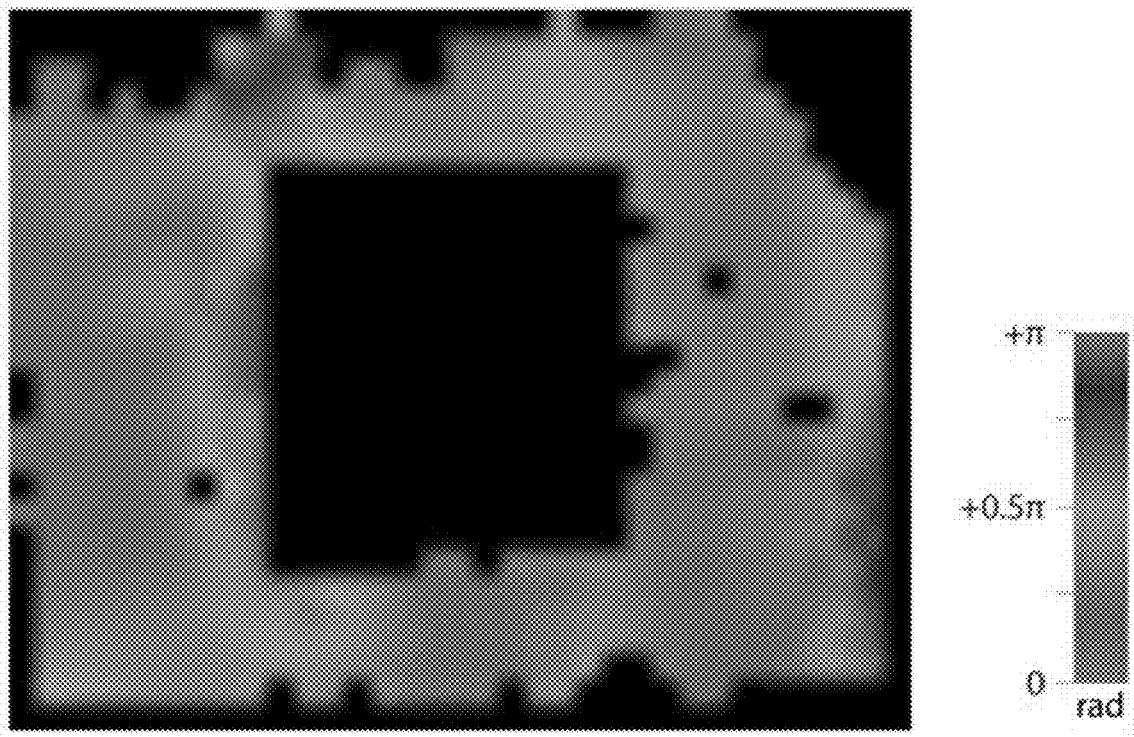
FIG. 3B is a view illustrating a geomagnetic map indicating geomagnetic direction information according to an embodiment of the disclosure.

FIG. 3B is a view illustrating a geomagnetic map indicating geomagnetic direction information, according to an embodiment of the disclosure.

Referring to FIG. 3B, geomagnetic direction information for an area included in the map may be identified through the geomagnetic map. For example, when the direction of the geomagnetic around the electronic apparatus 100 obtained through the geomagnetic sensor 130 is B radian (rad), the processor 140 may identify an area in which the geomagnetic direction is B rad within the area identified as the third estimated location as the second estimated location. In other words, the processor 140 may identify at least one of the identified third estimated locations as the second estimated location. However, the disclosure is not limited thereto, and the processor 140 may identify the area in which the geomagnetic direction is B rad in the entire geomagnetic map as the second estimated location. In addition, as an example, a location in a predetermined range (e.g., 1 m) from the location in which the geomagnetic direction is B rad may be identified as the second estimated location.

When the second estimated location and the direction of the electronic apparatus 100 are identified, the processor 140 may obtain the location of the electronic apparatus on the LiDAR map by using the identified second estimated location, the direction of the electronic apparatus and the LiDAR sensor 120. As an example, the processor 140 may use the LiDAR sensor for a location of a predetermined range radius (e.g., 1 m) from the second estimated location and a direction of a predetermined range radius (e.g., 20 degrees) from the direction of the identified electronic apparatus 100 to obtain the location of the electronic apparatus on the LiDAR map. As a result of using the LiDAR sensor for the location of the predetermined range radius (e.g., 1 m) from the second estimated location and the direction of the predetermined range radius (e.g., 20 degrees) from the direction of the identified electronic apparatus 100, when the location of the electronic apparatus 100 is not identified on the LiDAR map, the processor 140 may use the LiDAR sensor for the entire area of the LiDAR map and a direction of 360 degrees to obtain the location of the electronic apparatus 100 on the LiDAR map.

Meanwhile, the processor 140 may include one or more of a central processing unit (CPU) that processes digital signals, a micro controller unit (MCU), a micro processing unit (MPU), a controller, and an application processor (AP), a communication processor (CP), an ARM processor, or may be defined with a corresponding term. In addition, the processor 140 may be implemented as a system on chip (SoC) or large scale integration (LSI) in which a processing algorithm is embedded, or may be implemented in the form of a field programmable gate array (FPGA). The processor 140 may perform various functions by executing computer executable instructions stored in the memory 110.

Figure 2B:
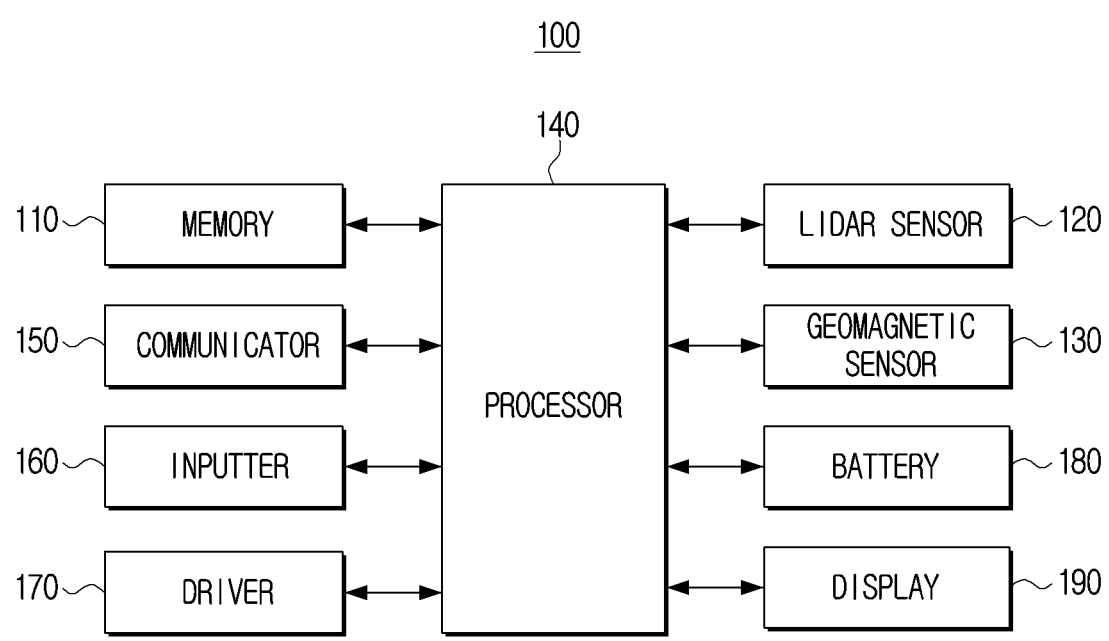
FIG. 2B is a block diagram illustrating a detailed configuration of an electronic apparatus according to an embodiment of the disclosure.

FIG. 2B is a block diagram illustrating a detailed configuration of an electronic apparatus according to an embodiment of the disclosure.

Referring to FIG. 2B, it may be a block diagram of a case when the electronic apparatus 100 is a mobile robot device. The electronic apparatus 100 may include a memory 110, a LiDAR sensor 120, a geomagnetic sensor 130, a processor 140, a communicator 150, an inputter 160, a driver 170, a battery 180, a display 190 and a wheel encoder 195.

The communicator 150 may include various types of communication modules to perform communication with external apparatuses or external servers. Communications connections of the communicator 150 with external apparatuses and external servers may include communicating through a third device (e.g., a repeater, a hub, an access point, a gateway, etc.).

The communicator 150 may include various communication modules that support wired and wireless communications. For example, the communicator 150 may include a cellular communication module that uses at least one of a wireless communication module, for example, long term evolution (LTE), LTE Advanced (LTE-A), code division multiple access (CDMA), wideband CDMA (WCDMA), universal mobile telecommunications system (UMTS), wireless broadband (WiBro), global system for mobile communications (GSM), or the like. As another example, the wireless communication module may include at least one of, for example, wireless fidelity (Wi-Fi), Bluetooth, Bluetooth low power (BLE), and Zigbee. According to an embodiment of the disclosure, the processor 140 may receive a LiDAR map or a geomagnetic map from an external apparatus or an external server through the communicator 150 and store it in the memory 110.

The inputter 160 may receive various user inputs and transmit them to the processor 140. In particular, the inputter 160 may include a touch sensor, a (digital) pen sensor, a pressure sensor, and a key. The touch panel 252 may, for example, use at least one of electrostatic type, pressure sensitive type, infrared type, and an ultraviolet type. Particularly, when a user command for changing information on a radius and a location of a predetermined range according to the disclosure is input, the inputter 160 may receive a signal including the user command and transmit it to the processor 140.

The driver 170 is a component capable of moving the electronic apparatus 100 under the control of the processor 140, and may include a motor and a plurality of wheels. Specifically, the driver 170 may change a moving direction and a moving speed of the electronic apparatus 100 under the control of the processor 140. In addition, as an example, the wheel encoder 195 may be included in the driver 170.

The battery 180 is a component for supplying power to the electronic apparatus 100, and the battery 180 may be charged by a charging station. As an embodiment, the battery 180 may include a receiving resonator for wireless charging. As an example, a method of charging the battery 180 may be a method that rapidly charges a predetermined capacity through a constant current (CC) charging method, and may be a method of constant current constant voltage (CCCV) that charges the remaining capacity, but is not limited thereto and may be charged in various ways.

The display 190 may display various types of information under the control of the processor 140. In particular, the display 190 may display a LiDAR map obtained through the LiDAR sensor 120 and a geomagnetic map obtained through the geomagnetic sensor 130 under the control of the processor 140.

In addition, the display 190 may display a UI capable of changing information on a radius and a location of a predetermined range under the control of the processor 140.

In addition, the display 190 may be implemented as a touch screen together with a touch panel. However, it is not limited to the implementation described above, and the display 190 may be implemented differently according to the type of the electronic apparatus 100.

Figure 4:
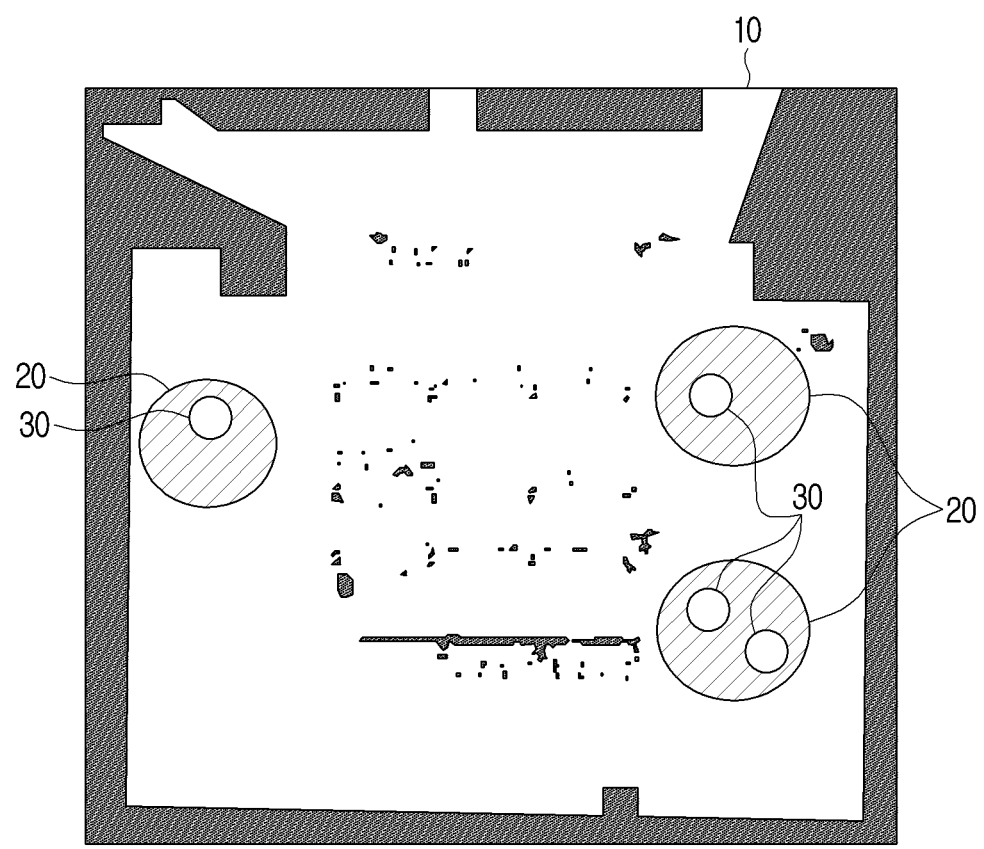
FIG. 4 is a view illustrating a location of an electronic apparatus on a LiDAR map using a geomagnetic map according to an embodiment of the disclosure.

FIG. 4 is a view illustrating a location of an electronic apparatus on a LiDAR map using a geomagnetic map according to an embodiment of the disclosure.

Referring to FIG. 4, it is a view illustrating a LiDAR map around the electronic apparatus. According to an embodiment, the electronic apparatus may use a geomagnetic map to obtain a third estimated location and a second estimated location of the electronic apparatus on the LiDAR map.

Specifically, when a geomagnetic map around the electronic apparatus is obtained, the electronic apparatus may match geomagnetic size information included in the geomagnetic map as shown in FIG. 3A with geomagnetic size information at a current location of the electronic apparatus obtained through a geomagnetic sensor. And as a result of matching, the electronic apparatus may identify an area having the same size as the geomagnetic size information of the current location of the electronic apparatus obtained through the geomagnetic sensor from the geomagnetic map, and identify the third estimated location 20 of the electronic apparatus on the LiDAR map 10 by matching the area identified from the geomagnetic map with the LiDAR map. In other words, the third estimated location 20 of FIG. 4 may represent an area in which the geomagnetic size information measured at the current location of the electronic apparatus and the size information measured at the geomagnetic map are matched. In addition, the electronic apparatus may identify only an area in which the geomagnetic size information obtained through the geomagnetic sensor and the geomagnetic size information displayed on the geomagnetic map are the same as the third estimated location 20, but is not limited thereto, and an area having a predetermined range radius (e.g., 1 m) in the area in which the geomagnetic size information obtained through the geomagnetic sensor and the geomagnetic size information illustrated in the geomagnetic map are the same as the third estimated location 20.

In addition, the electronic apparatus may match the geomagnetic direction information included in the geomagnetic map as illustrated in FIG. 3B with the geomagnetic direction information at the current location of the electronic apparatus obtained through the geomagnetic sensor. As a result of matching, an area having the same direction as the geomagnetic direction information at the current location of the electronic apparatus obtained through the geomagnetic sensor in the third estimated location 20 may be identified from the geomagnetic map, and the second estimated location 30 of the electronic apparatus on the LiDAR map 10 may be identified by matching the area identified from the geomagnetic map with the LiDAR map 10. In other words, the second estimated location 30 of FIG. 4 may indicate an area in which the geomagnetic direction information measured at the current location of the electronic apparatus in the third estimated location 20 matches the direction information on the geomagnetic map. Also, only the area in which the geomagnetic direction information obtained through the geomagnetic sensor is the same as the geomagnetic direction information displayed in the geomagnetic map may be identified as the second estimated location 30, but is not limited thereto, an area having a predetermined range radius (e.g., 0.5 m) in the area where the geomagnetic direction obtained through the geomagnetic sensor is the same as the geomagnetic direction information displayed on the geomagnetic map as the second estimated location 30.

The electronic apparatus may obtain the location of the electronic apparatus on the LiDAR map 10 through the LiDAR sensor based on the identified second estimated location 30 and the direction of the electronic apparatus identified through the geomagnetic sensor. In other words, the electronic apparatus may obtain the location of the electronic apparatus in the second estimated location 30 by preferentially using the LiDAR sensor for the second estimated location 30 and the direction of the predetermined range radius (e.g., 20 degrees) from the direction of the identified electronic apparatus.

Figure 5:
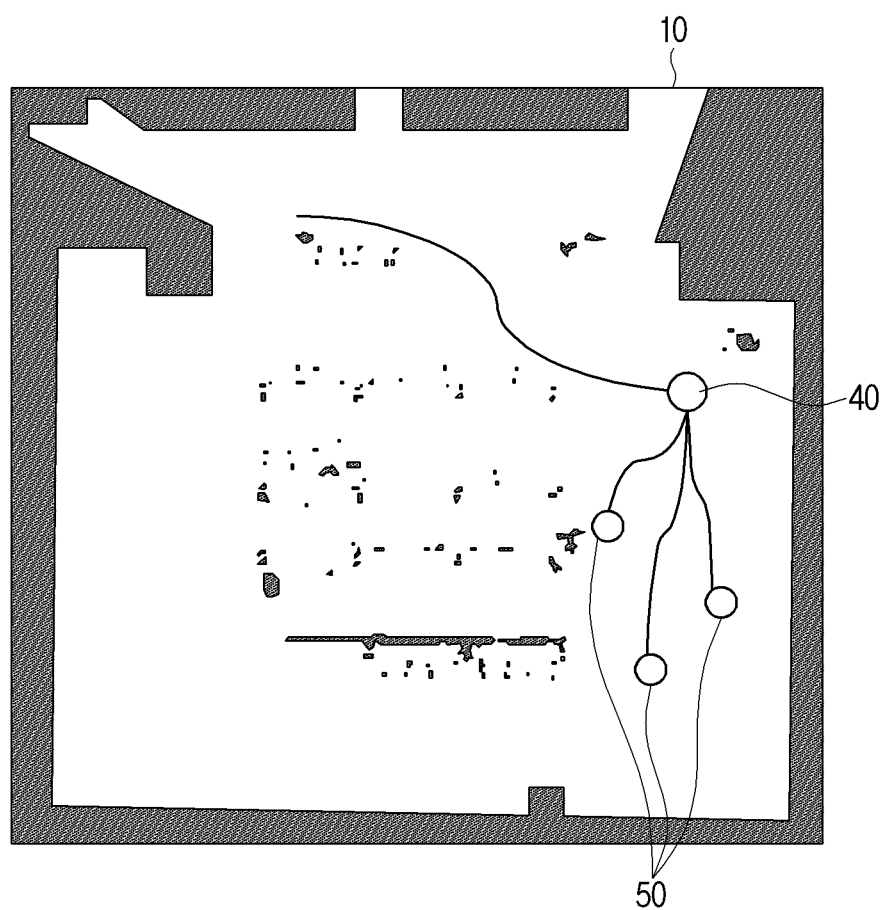
FIG. 5 is a view illustrating a method of obtaining a current location of an electronic apparatus when a recent location of an electronic apparatus is pre-stored according to an embodiment of the disclosure.

FIG. 5 is a view illustrating a method of obtaining a current location of an electronic apparatus when a recent location of an electronic apparatus is pre-stored according to an embodiment of the disclosure.

Referring to FIG. 5, when the electronic apparatus loses a current location of the electronic apparatus while performing SLAM through the LiDAR sensor, the electronic apparatus may use at least one of the IMU sensor and the wheel encoder and a geomagnetic sensor to obtain the current location of the electronic apparatus. The IMU sensor is an inertial measurement sensor and may be implemented as an acceleration sensor, an angular velocity sensor, a geomagnetic sensor, and an altimeter sensor.

When the latest location 40 of the electronic apparatus 100 is pre-stored in the memory, in order to obtain the current location of the electronic apparatus 100, the electronic apparatus 100 may use the IMU sensor or the wheel encoder to preferentially estimate the location of the electronic apparatus 100 based on the latest location 40 of the electronic apparatus 100. In other words, the electronic apparatus 100 may identify the first estimated location 50 of the electronic apparatus 100 using the IMU sensor or the wheel encoder based on the latest location 40 pre-stored in the memory. As an example, when the IMU sensor is used, the first estimated location of the electronic apparatus 100 may be identified through a method of obtaining acceleration and angular velocity of the electronic apparatus from the IMU sensor and integrating the obtained acceleration and angular velocity. When the wheel encoder is used, the first estimated location of the electronic apparatus 100 may be identified based on information on a trajectory of the electronic apparatus 100 obtained through the wheel encoder.

In addition, the electronic apparatus 100 may preferentially obtain the location of the electronic apparatus 100 by using the LiDAR sensor, with respect to the first estimated location 50 and the direction of the electronic apparatus identified through the geomagnetic sensor. Specifically, the electronic apparatus 100 may perform a search through the LiDAR sensor preferentially for a location (e.g., 1 m) of the predetermined range radius from the first estimated location obtained through at least one of the IMU sensor and the wheel encoder, and a direction (e.g., +_20 degrees) of the predetermined range radius from the direction of the identified electronic apparatus in order to obtain the location of the electronic apparatus 100.

Figure 6:
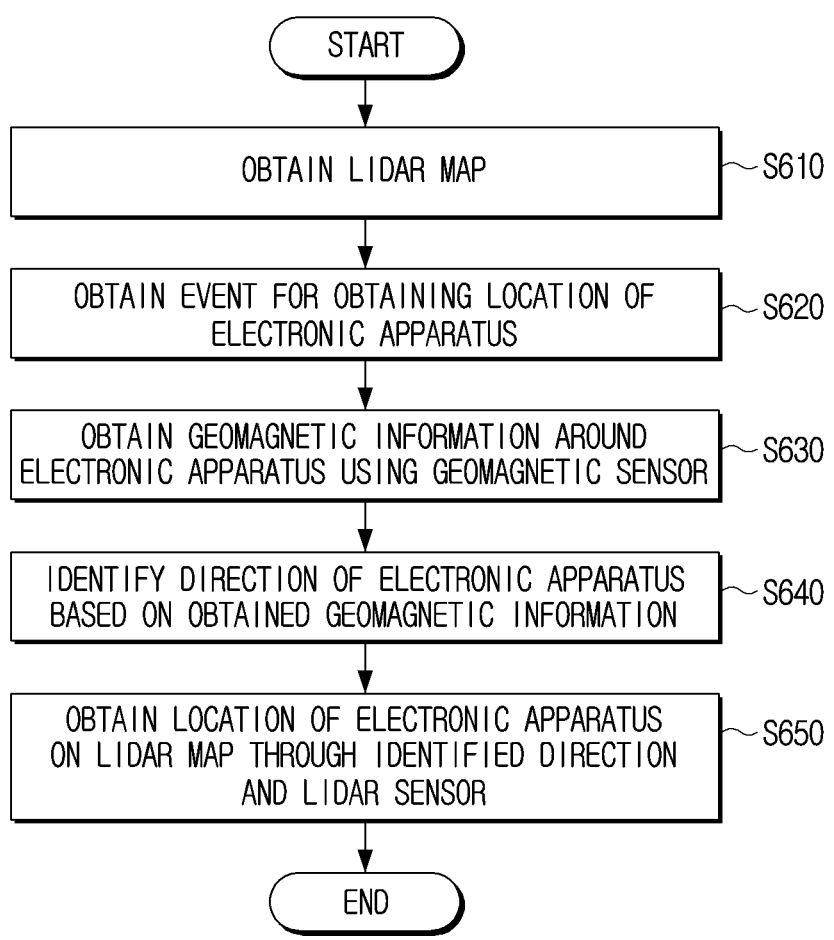
FIG. 6 is a flowchart illustrating a method of controlling an electronic apparatus according to an embodiment of the disclosure.

FIG. 6 is a flowchart illustrating a method of controlling an electronic apparatus according to an embodiment the disclosure.

Referring to FIG. 6, the electronic apparatus 100 may obtain a LiDAR map for estimating the location of the electronic apparatus 100 at operation S610. The electronic apparatus 100 may obtain the location of the electronic apparatus 100 based on a result of scanning the surroundings of the electronic apparatus 100 using a LiDAR sensor. Specifically, the electronic apparatus 100 may obtain a LiDAR map for an area to which the electronic apparatus 100 is to move through the LiDAR sensor. However, the disclosure is not limited thereto, the electronic apparatus 100 may obtain the LiDAR map by receiving the LiDAR map for the area to which the electronic apparatus 100 is to move from external servers.

In addition, the electronic apparatus 100 may obtain an event for obtaining the location of the electronic apparatus 100 at operation S620. The event for obtaining the location of the electronic apparatus according to the disclosure include a first event in which the electronic apparatus is turned off and on, a second event in which the user lifts the electronic apparatus and moves it at a random place, a third event when a difference between an initially obtained map and a currently scanned map is large, a fourth event in which the electronic apparatus is lost while driving, and a fifth event in which scanning is impossible since the electronic apparatus are surrounded by people. However, the disclosure is not limited thereto, and the electronic apparatus may further include various events for estimating the location.

When the LiDAR map is obtained and an event for obtaining the location of the electronic apparatus occurs, the electronic apparatus 100 may obtain geomagnetic information around the electronic apparatus 100 using a geomagnetic sensor included in the electronic apparatus 100 at operation S630. The geomagnetic sensor is a sensor for measuring a geomagnetic value around the sensor, and may be included in the electronic apparatus 100.

When the geomagnetic information is obtained, the electronic apparatus 100 may identify the direction of the electronic apparatus based on the geomagnetic information at operation S640. As an example, the electronic apparatus 100 may identify the direction of the electronic apparatus through information on the geomagnetic direction included in the geomagnetic information. Specifically, the electronic apparatus may identify true north direction by using information on the geomagnetic direction. In addition, the direction of the electronic apparatus 100 on the LiDAR map 10 may be identified by matching the identified true north direction with the true north direction on the obtained LiDAR map 10.

When the direction of the electronic apparatus 100 is identified, the electronic apparatus 100 may obtain the location of the electronic apparatus on the LiDAR map 10 through the identified direction and the LiDAR sensor at operation S650. According to an embodiment of the disclosure, a location of the electronic apparatus may be preferentially obtained by performing a search using the LiDAR sensor for a direction of a radius of a predetermined range from the identified direction.

FIG. 7 is a flowchart illustrating a method of obtaining a location of an electronic apparatus by further using a geomagnetic map according to an embodiment of the disclosure.

Referring to FIG. 7, the electronic apparatus 100 may obtain a LIDAR map for estimating the location of the electronic apparatus 100 at operation S710. Specifically, the electronic apparatus 100 may obtain a LiDAR map for an area to which the electronic apparatus 100 is to move through the LiDAR sensor. However, the disclosure is not limited thereto, and the electronic apparatus 100 may obtain the LiDAR map by receiving the LiDAR map to which the electronic apparatus 100 is to move from the external server.

The electronic apparatus 100 may obtain a geomagnetic map of the surroundings of the electronic apparatus by using the geomagnetic sensor at operation S720. The geomagnetic map is a map showing geomagnetic size information and geomagnetic direction information for a certain area. According to an embodiment, the electronic apparatus 100 may move an area in which a geomagnetic map is to be generated, and obtain a geomagnetic map using the geomagnetic sensor 130 of the electronic apparatus 100. However, the disclosure is not limited thereto, and the geomagnetic map may be received from an external apparatus storing the geomagnetic map.

In addition, the electronic apparatus 100 may obtain an event for obtaining the location of the electronic apparatus 100 at operation S730. When the event for obtaining the location of the electronic apparatus 100 occurs, the electronic apparatus 100 may obtain geomagnetic information around the electronic apparatus 100 using the geomagnetic sensor included in the electronic apparatus 100 at operation S740. The geomagnetic sensor is a sensor for measuring a geomagnetic value around the sensor, and may be included in the electronic apparatus 100.

The electronic apparatus 100 may identify the direction of the electronic apparatus 100 and at least one second estimated location by matching the geomagnetic size information and direction information included in the geomagnetic map with the geomagnetic information at operation S750. Specifically, at least one third estimated location of the electronic apparatus 100 may be identified by matching the geomagnetic size information included in the geomagnetic map with the geomagnetic size information included in the geomagnetic information obtained through the geomagnetic sensor. In addition, the electronic apparatus 100 may identify at least one second estimated location of the electronic apparatus 100 and the direction of the electronic apparatus by matching the geomagnetic direction information included in the geomagnetic map with the geomagnetic direction information included in the geomagnetic information obtained through the geomagnetic sensor. As an example, the electronic apparatus 100 may identify at least one of the identified third estimated locations as the second estimated location.

When the second estimated location and the direction of the electronic apparatus 100 are identified, the electronic apparatus 100 may obtain the location of the electronic apparatus 100 on the LiDAR map by using the identified second estimated location, the direction of the electronic apparatus 100, and the LiDAR sensor at operation S760. As an example, the electronic apparatus 100 may obtain the direction of the electronic apparatus on the LiDAR map by using the LiDAR sensor for a location of the predetermined range radius (e.g., 1 m) from the second estimated location, and a direction of the predetermined range radius (e.g., 20 degrees) from the direction of the electronic apparatus 100. As a result of using the LiDAR sensor for the location of the predetermined range radius (e.g., 1 m) from the second estimated location and the direction of the predetermined range radius (e.g., 20 degrees) from the identified direction of the electronic apparatus 100, when the location of the electronic apparatus 100 is not identified on the map, the processor 140 may use the LiDAR sensor for the entire area of the LiDAR map and a direction of 360 degrees to obtain the location of the electronic apparatus 100 on the LiDAR map.

As described above, various embodiments of the disclosure have been described with reference to the drawings. However, it should be understood that the disclosure is not limited to the specific embodiments described hereinafter, but includes various modifications, equivalents, and/or alternatives of the embodiments of the disclosure.

The terms "have", "may have", "include", and "may include" used in the various embodiments of the disclosure indicate the presence of corresponding features (e.g., elements such as numerical values, functions, operations, or parts), and do not preclude the presence of additional features.

In the description, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B.

In the description, the terms "first, second, and so forth" are used to describe diverse elements regardless of their order and/or importance and to discriminate one element from other elements, but are not limited to the corresponding elements. For example, a first user appliance and a second user appliance may indicate different user appliances regardless of their order or importance. For example, without departing from the scope as described herein, a first element may be referred to as a second element, or similarly, a second element may be referred to as a first element.

In the various embodiment of the disclosure, the term "module," "unit," or "part" is referred to as an element that performs at least one function or operation, and may be implemented with hardware, software, or a combination of hardware and software. In addition, a plurality of "modules," a plurality of "units," a plurality of "parts" may be integrated into at least one module or chip except for a "module," a "unit," or a "part" which has to be implemented with specific hardware, and may be implemented with at least one processor (not shown). Also, the term "user" may refer to a person who uses an electronic apparatus or an apparatus (e.g., an artificial intelligence (AI) electronic apparatus) that uses the electronic apparatus.

When an element (e.g., a first element) is "operatively or communicatively coupled with/to" or "connected to" another element (e.g., a second element), an element may be directly coupled with another element or may be coupled through the other element (e.g., a third element). n the other hand, when an element (e.g., a first element) is "directly coupled with/to" or "directly connected to" another element (e.g., a second element), an element may not be existed between the other element.

In the description, the term "configured to" may be changed to, for example, "suitable for", "having the capacity to", "designed to", "adapted to", "made to", or "capable of" under certain circumstances. The term "configured to (set to)" does not necessarily mean "specifically designed to" in a hardware level. Under certain circumstances, the term "device configured to" may refer to "device capable of" doing something together with another device or components. For example, "a sub-processor configured (or configured to) perform A, B, and C" may refer to a generic-purpose processor (e.g., central processing unit (CPU)) or an application processor) capable of performing corresponding operations by executing a dedicated processor (e.g., an embedded processor) or one or more software programs stored in a memory device to perform the operations.

The terms used in the description are used to merely describe a specific embodiment, but may not intend to limit the scope of other embodiments. Unless otherwise defined specifically, a singular expression may encompass a plural expression. All terms (including technical and scientific terms) used in the description could be used as meanings commonly understood by those ordinary skilled in the art to which the disclosure belongs. The terms that are used in the disclosure and are defined in a general dictionary may be used as meanings that are identical or similar to the meanings of the terms from the context of the related art, and they are not interpreted ideally or excessively unless they have been clearly and specially defined. According to circumstances, even the terms defined in the embodiments of the disclosure should not be interpreted as excluding the embodiments of the disclosure.

The various embodiments described above may be implemented as an S/W program including an instruction stored on machine-readable (e.g., computer) storage media. The machine is an apparatus which is capable of calling a stored instruction from the storage medium and operating according to the called instruction, and may include an electronic apparatus (e.g., an electronic apparatus 100) according to the above-described example embodiments. When the instruction is executed by a processor, the processor may perform a function corresponding to the instruction directly or using other components under the control of the processor. The command may include a code generated or executed by a compiler or an interpreter.

The machine-readable storage media may be provided in a form of a non-transitory storage media. The 'non-transitory' means that the storage media does not include a signal and is tangible, but does not distinguish whether data is stored semi-permanently or temporarily in the storage media. For example, the 'non-transitory' may include a buffer that data is temporarily stored.

Each of the components (e.g., modules or programs) according to the various embodiments described above may include a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration. Operations performed by a module, a program module, or other component, according to various embodiments, may be sequential, parallel, or both, executed iteratively or heuristically, or at least some operations may be performed in a different order, omitted, or other operations may be added.

According to an embodiment of the disclosure, the methods according to various embodiments described above may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a portion of the computer program product may be at least temporarily stored or provisionally generated on the storage media, such as a manufacturer's server, the application store's server, or a memory in a relay server.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an electronic apparatus comprising:
    obtaining, by the electronic apparatus, a light detection and ranging (LiDAR) map prestored in memory for estimating a location of the electronic apparatus;
    based on an event for obtaining the location of the electronic apparatus occurring, obtaining, by the electronic apparatus, geomagnetic information around the electronic apparatus using a geomagnetic sensor;
    identifying, by the electronic apparatus, a direction of the electronic apparatus based on the obtained geomagnetic information; and
    based on the electronic apparatus being within a predetermined range radius from the identified direction, searching, by the electronic apparatus, the location of the electronic apparatus on the LiDAR map using a LiDAR sensor,
    wherein the identifying comprises:
        obtaining a geomagnetic map around the electronic apparatus using the geomagnetic sensor;
        identifying the direction of the electronic apparatus on the LiDAR map and at least one second estimated location by matching geomagnetic size information and direction information included in the obtained geomagnetic map with the geomagnetic information; and searching the location of the electronic apparatus on the LiDAR map through the LiDAR sensor based on the direction of the electronic apparatus on the LiDAR map and the at least one second estimated location, and wherein the electronic apparatus is configured to travel to an area where the electronic apparatus intends to generate a geomagnetic map.

2. The method of claim 1, wherein the geomagnetic information includes information on a geomagnetic direction around the electronic apparatus, and wherein the identifying comprises:
  identifying a true north direction using the information on the geomagnetic direction; and
  identifying a direction of the electronic apparatus on the LiDAR map by matching the identified true north direction with the true north direction on the LiDAR map.

3. The method of claim 1, further comprising:

based on the electronic apparatus not being within the predetermined range radius from the identified direction, searching, by the electronic apparatus, the location of the electronic apparatus on the LiDAR map using the LiDAR sensor with respect to a direction of 360 degrees.

4. The method of claim 1, further comprising:

while a recent location of the electronic apparatus is pre-stored, based on an event for searching the location of the electronic apparatus occurring, identifying a first estimated location of the electronic apparatus on the LiDAR map using at least one of an inertia measurement unit (IMU) sensor or a wheel encoder; and based on the first estimated location, the identified direction, and the LiDAR sensor, searching the location of the electronic apparatus on the LiDAR map.

5. The method of claim 4, wherein the identifying further comprises:

identifying at least one third estimated location of the electronic apparatus on the LiDAR map by matching geomagnetic size information included in the obtained geomagnetic map with the geomagnetic size information included in the geomagnetic information; and identifying the direction of the electronic apparatus on the LiDAR map, and at least one second estimated location of the electronic apparatus on the LiDAR map, wherein the identifying the second estimated location comprises identifying at least one location among the identified at least one third estimated location as the second estimated location.

6. The method of claim 1, wherein the searching the location comprises searching the location of the electronic apparatus on the LiDAR map using the LiDAR sensor with respect to the location of a predetermined range radius from the second estimated location, and the direction of the predetermined range radius from the identified direction.

7. The method of claim 6, further comprising:

based on the location of the electronic apparatus not being within a predetermined range from the second estimated location, and the direction of the predetermined range radius from the identified direction, searching the location of the electronic apparatus on the LiDAR map using the LiDAR sensor with respect to an entire location of the LiDAR map and a direction of 360 degrees.

8. An electronic apparatus comprising:

memory storing one or more computer programs; and one or more processors communicatively coupled to the memory, wherein the one or more computer programs include computer-executable instructions that, when executed by the one or more processors individually or collectively, cause the electronic apparatus to:
  obtain a LiDAR map prestored in the memory for estimating a location of the electronic apparatus, based on an event for obtaining the location of the electronic apparatus occurring,
  obtain geomagnetic information around the electronic apparatus using a geomagnetic sensor,
  identify a direction of the electronic apparatus based on the obtained geomagnetic information, and
  search the location of the electronic apparatus on the LiDAR map using a LiDAR sensor based on the electronic apparatus being within a predetermined range radius from the identified direction, wherein the one or more computer programs further include computer-executable instructions that, when executed by the one or more processors individually or collectively, cause the electronic apparatus to:
  obtain a geomagnetic map around the electronic apparatus using the geomagnetic sensor,
  identify the direction of the electronic apparatus on the LiDAR map and at least one second estimated location by matching geomagnetic size information and direction information included in the obtained geomagnetic map with the geomagnetic information, and
  search the location of the electronic apparatus on the LiDAR map through the LiDAR sensor based on the direction of the electronic apparatus on the LiDAR map and the at least one second estimated location, and wherein the electronic apparatus is configured to travel to an area where the electronic apparatus intends to generate a geomagnetic map.

9. The electronic apparatus of claim 8, wherein the geomagnetic information includes information on a geomagnetic direction around the electronic apparatus, and wherein the one or more computer programs include computer-executable instructions that, when executed by the one or more processors individually or collectively, cause the electronic apparatus to:
  identify a true north direction using the information on the geomagnetic direction, and
  identify a direction of the electronic apparatus on the LiDAR map by matching the identified true north direction with the true north direction on the LiDAR map.

10. The electronic apparatus of claim 8, wherein the one or more computer programs further include computer-executable instructions that, when executed by the one or more processors, cause the electronic apparatus, based on the electronic apparatus not being within the predetermined range radius from the identified direction, to search the location of the electronic apparatus on the LiDAR map using the LiDAR sensor with respect to a direction of 360 degrees.

11. The electronic apparatus of claim 8, wherein one or more computer programs further include computer-executable instructions that, when executed by the one or more processors individually or collectively, cause the electronic apparatus, while a recent location of the electronic apparatus is pre-stored, based on an event for searching the location of the electronic apparatus occurring, to identify a first estimated location of the electronic apparatus on the LiDAR map using at least one of an inertia measurement unit (IMU) sensor or a wheel encoder, and based on the first estimated location, the identified direction, and the LiDAR sensor, obtain the location of the electronic apparatus on the LiDAR map.

12. The electronic apparatus of claim 8, wherein the one or more computer programs further include computer-executable instructions that, when executed by the one or more processors individually or collectively, cause the electronic apparatus to:

identify at least one third estimated location of the electronic apparatus on the LiDAR map by matching the geomagnetic size information included in the obtained geomagnetic map with the geomagnetic size information included in the geomagnetic information, identify the direction of the electronic apparatus on the LiDAR map, and at least one second estimated location of the electronic apparatus on the LiDAR map by matching geomagnetic direction information included in the obtained geomagnetic map with geomagnetic direction information included in the geomagnetic information, and based on the second estimated location being located, to identify at least one location among the identified at least one third estimated location as the second estimated location.

13. The electronic apparatus of claim 8, wherein the one or more computer programs further include computer-executable instructions that, when executed by the one or more processors individually or collectively, cause the electronic apparatus to search the location of the electronic apparatus on the LiDAR map by using the LiDAR sensor with respect to the location of a predetermined range from a second estimated location, and the direction of the predetermined range radius from the identified direction.

14. The electronic apparatus of claim 13, wherein the one or more computer programs further include computer-executable instructions that, when executed by the one or more processors individually or collectively, cause the electronic apparatus to, based on the location of the electronic apparatus not being within a predetermined range from the second estimated location, and the direction of the predetermined range radius from the identified direction, search the location of the electronic apparatus on the LiDAR map by using the LiDAR sensor with respect to an entire location of the LiDAR map and a direction of 360 degrees.

15. The electronic apparatus of claim 8, wherein the an event for searching the location of the electronic apparatus comprises at least one of: an event in which the electronic apparatus is turned off and on, an event in which a user lifts the electronic apparatus and moves it at a random place, an event when a difference between an initially obtained map and a currently scanned map is large, an event in which the electronic apparatus is lost while driving, or an event in which scanning is impossible since the electronic apparatus is surrounded by people.

16. The electronic apparatus of claim 13, wherein the one or more computer programs further include computer-executable instructions that, when executed by the one or more processors individually or collectively, cause the electronic apparatus to, based on the location of the electronic apparatus not being within the predetermined range from the second estimated location, and the direction of the predetermined range radius from the identified direction, search the location of the electronic apparatus on the LiDAR map by using the LiDAR sensor and incrementally increasing the predetermined range radius.

* * * * *